(12) United States Patent
Lee et al.

(10) Patent No.: US 6,436,469 B1
(45) Date of Patent: *Aug. 20, 2002

(54) METHOD FOR PREPARING TRANSPARENT CONDUCTIVE THIN FILM BY RAPID THERMAL ANNEALING METHOD

(75) Inventors: Hyun-Gon Lee; Eu-Gene Kim; Jung-Hyun Oh; Sang-Soo Oh; Jun-Beom Kim, all of Kyungki-do (KR)

(73) Assignee: Samsung Chemical Paint Co., Ltd. (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/574,125

(22) Filed: May 19, 2000

(30) Foreign Application Priority Data

Dec. 28, 1999 (KR) .............................. 99-63797

(51) Int. Cl.[7] .............................. B05D 5/06; B05D 3/02; B05D 1/36; B05D 1/02; B05D 1/18
(52) U.S. Cl. ..................... 427/165; 427/126.3; 427/168; 427/169; 427/419.3; 427/376.2; 427/374.1; 427/398.4; 427/427; 427/428; 427/240; 427/443.2
(58) Field of Search .............................. 427/126.3, 165, 427/168, 169, 419.3, 376.2, 374.1, 398.3, 398.4, 427, 428, 240, 443.2

(56) References Cited

U.S. PATENT DOCUMENTS

| | | | | |
|---|---|---|---|---|
| 5,017,508 A | * | 5/1991 | Dodt et al. ................. | 437/173 |
| 5,025,490 A | * | 6/1991 | Tamura ...................... | 313/479 |
| 5,260,094 A | * | 11/1993 | Giannelis et al. ............. | 427/79 |
| 5,728,626 A | * | 3/1998 | Allman et al. .............. | 438/608 |
| 6,010,923 A | * | 1/2000 | Jinno ......................... | 438/158 |
| 6,025,037 A | | 2/2000 | Wadman et al. | |
| 6,037,640 A | * | 3/2000 | Lee ............................ | 257/408 |
| 6,045,956 A | * | 4/2000 | Kato et al. ................... | 430/47 |
| 6,090,645 A | * | 7/2000 | Hamada .................... | 438/143 |
| 6,173,116 B1 | * | 1/2001 | Roozeboom et al. ....... | 392/416 |

FOREIGN PATENT DOCUMENTS

| | | | |
|---|---|---|---|
| JP | 9-199021 | * | 7/1997 |
| KR | 1992-0006998 | | 11/1993 |
| KR | 93-7820 | | 12/1994 |
| WO | WO-95/29501 | * | 11/1995 |

* cited by examiner

*Primary Examiner*—Michael Barr
(74) *Attorney, Agent, or Firm*—Alston & Bird LLP

(57) ABSTRACT

The present invention relates to a transparent conductive thin film and a method for the preparation of the same., and more particularly to a method for the preparation of a transparent conductive thin film comprising the steps of a) preparing a sol solution of antimony-tin oxides (ATO) or indium-tin oxides (ITO), b) forming a transparent coating layer on an outer surface of a cathode ray tube using the sol solution, and c) rapidly increasing a temperature of the transparent coating layer to a predetermined temperature of 300 to 1200° C., and rapidly cooling the transparent coating layer either immediately or after maintaining the predetermined temperature for up to 20 seconds, and a transparent conductive thin film prepared by this preparation method, i.e., a transparent conductive thin film which not only has superior conductivity, high hardness, and non-reflectivity but also saves production process time and increases production process effectiveness, and a method for the preparation of the same.

16 Claims, 3 Drawing Sheets

METHOD FOR PREPARING TRANSPARENT CONDUCTIVE THIN FILM BY RAPID THERMAL ANNEALING METHOD

CROSS REFERENCE TO RELATED APPLICATION

This application is based on application No 99-63797 filed in the Korean Industrial Property Office on Dec. 28, 1999, the content of which is incorporated hereinto by reference.

BACKGROUND OF THE INVENTION (a) Field of the Invention

The present invention relates to a transparent conductive thin film and its preparation method and more particularly to a transparent conductive thin film consisted of silicon oxides, antimony-tin oxides, and indium-tin oxides which has superior hardness, conductivity, and non-reflexibility, while at the same time providing a uniform surface in a timely and economically efficient manner, and a method for the preparation of the same.

(b) Description of the Related Art

Generally, antimony tin oxides (hereinafter referred to as ATO) and indium tin oxides (hereinafter referred to as ITO) thin films are being extensively used in monitors for blocking generated detrimental electromagnetic waves, in transparent electrodes of Liquid Crystal Display components, in anti-fogging heating layers for window glass, etc. Furthermore, ATO and ITO thin films can obtain non-reflexibility according to both the coating thickness and the alignment of silicon oxides and the above oxides. Hence, a monitor's light reflection is decreased to produce vivid picture quality. This technique can also be applied to the ordinary glass, too.

Conventionally, a vacuum deposition method, a sputtering method, or the like etc. are widely known as methods for the preparation of above ATO and ITO thin films. However, compared with the present invention, there have been difficulties in terms of the economical and timely effectiveness in applying such coatings on large spacious windows or on car glass due to high equipment cost and coating area limits, although they can be applied to Liquid Crystal Displays, anti-fogging heating layers, etc.

A dip-coating method, spin-coating method, spray-coating method, and the like etc. are disclosed in Korean Patent Publication Nos. 94-25969 and 95-3458.

First, when a dip-coating method or spin-coating method among these methods is used, a sol of silicon oxides is prepared by mixing one to four parts water and ethanol, isopropanol, isobutanol, normal propanol, normal butanol, ethyl cellosolve, ethyl carbitol, etc. with one part tetra ethoxy silane, tetra methoxy silane, or some other silane based compound. Furthermore, this sol can be prepared by additionally adding non water soluble solvents such as benzene, toluene, etc. The prepared silicon oxide sol is coated as a coating solution to be cured at a temperature of from 50 to 120° C. for a period ranging a few minutes to dozens of minutes.

On the other hand, a compound having as its main constituents tin and antimony, an inorganic acid of tin salts such as tin chloride hydrate, as a tin compound, an inorganic acid of antimony salts such as an antimony chloride hydrate, as an antimony compound, and an organic acid of tin salts or antimony salts can be used when preparing an ATO sol coating solution.

After a solution prepared using these compounds is coated by the above coating method, an ATO transparent thin film is manufactured by firing it at a high temperature of 300 to 1200° C. for a period ranging from a few dozen minutes to a few hours.

Secondly, when the spray-coating method is used, a transparent conductive thin film is obtained by spraying the above ATO sol solution on it after the material on which a transparent thin film is to be formed is heated to over 400° C.

Furthermore, an ITO sol solution is coated using the above coating methods, wherein an inorganic acid of indium salts such as indium chloride hydrate or indium nitride hydrate, as an indium compound, and an inorganic acid of tin salts such as tin chloride hydrate, as a tin compound are used in order to prepare the ITO sol. During the preparation of a transparent conductive thin film, indium-tin oxides, as compared to ATO, have the disadvantage of higher cost due to high priced indium, while they have an advantage in that surface resistance can be lowered to a level of $10\sim10^2$ $\Omega/cm^2$.

However, the above methods have the following problems.

First, dozens of minutes are required to increase the temperature to a high temperature of between 300 to 1200° C. during the coating firing. Additionally, superior conductivity and transparency are obtained through the firing and cooling that can take from a few dozen minutes to a few hours according to the temperature employed. Hence, there is a disadvantage in that process time losses are great since the firing time is so long and the cooling time also requires from a few dozen minutes to a few hours.

Secondly, there are various problems when the above is applied to a cathode-ray tube (CRT) or monitor after the preparing process has been finished and the device is completely assembled and holding a vacuum. These adverse effects are represented by the deterioration of internal fluorescent bodies and other components and the operation yield is decreased when the firing is done at a high temperature ranging from 300 to 1200° C. for several hours.

SUMMARY OF THE INVENTION

The present invention is for solving the above problems and it is an object of the present invention to provide a method for the preparation of a transparent conductive thin film for stabilizing the process high temperature and shortening process time.

It is another object of the present invention to provide an ATO or ITO transparent conductive thin film having superior conductivity and outstanding transparency and hardness prepared by the above methods.

In order to accomplish the above objects, the present invention provides a method for the preparation of a transparent conductive thin film comprising the steps of:

a) preparing a sol solution of antimony-tin oxides (ATO) or indium-tin oxides (ITO);

b) forming a transparent coating layer on an outer surface of a cathode-ray tube using the sol solution of antimony-tin oxides (ATO) or indium-tin oxides (ITO); and c) rapidly increasing a temperature of the transparent coating layer to a predetermined temperature, and rapidly cooling the transparent coating layer either immediately or after maintaining the predetermined temperature for up to 20 seconds.

The present invention can further comprise the step of coating a coating layer of silicon oxides in order for a transparent conductive thin film to obtain light non reflection effectiveness as a pre-treatment step prior to a step of forming a transparent coating layer according to the step b).

The present invention prepares an ATO or ITO sol solution in a method for forming a transparent layer using ATO or ITO when preparing a transparent conductive thin film. When using ATO, one antimony salt selected from the group consisting of tertiary antimony chloride, penta-antimony chloride, tertiary antimony fluoride, tertiary antimony iodide, and antimony acetate is dissolved by solvent so that one tin salt selected from the group consisting of quaternary tin chloride, secondary tin chloride, secondary tin acetate, quaternary tin acetate, secondary tin bromide, and quaternary tin bromide can have a content ratio of 1 to 15% in the preparation method of this sol solution. One or more of solvents selected from the group consisting of ethanol, normal butanol, isobutanol, normal propanol, isopropanol, methylisobutyl carbinol, cyclohexanol, 2-ethylhexanol, ethyl carbitol, and ethyl cellosolve are used as the above solvent.

In this process, the solution is refluxed at a temperature of 50 to 90° C. for hours, 2 to 20 equivalent weights of tertiary distilled water per tin equivalent weight are mixed in, and it is again refluxed at the above temperature for hours. Hydrochloric acid, acetic acid, iodic acid, bromic acid, hydrofluoric acid, and the like are removed by drying this prepared solution at a temperature of 150° C. until it becomes powder. This is because coating capability is deteriorated due to the acidic effects of hydrochloric acid and other acids. After executing the above drying procedure, the sol solution containing 1 to 15% of solid contents suitable for coating is prepared using one or more of the above solvents.

An ITO sol solution preparation is also the same as in the above ATO preparation method, and one salt selected from the group consisting of primary indium chloride, tertiary indium chloride, tertiary indium fluoride, tertiary indium hydroxide, primary indium iodide, and tertiary indium acetate is used as an indium salt.

Accordingly a transparent coating layer is formed with this prepared sol solution on the outer surface of glass, including a CRT tube, using a dip-coating method, spin-coating method, spray-coating method, or the like, and is heated to a predetermined temperature, and then fired by the Rapid Thermal Annealing (RTA) method.

A preparation method of a transparent conductive thin film of the present invention can further comprise a primary drying step at a temperature of 60 to 250° C. for one to thirty minutes before the firing step of the above c).

Furthermore, the preparation method of the present invention further comprise, a step of Rapid Thermal Annealing, wherein the Rapid Thermal Annealing method is carried out under nitrogen or argon gas environment.

Furthermore, the step b) of the present invention provides a preparation method of a transparent conductive thin film which is coated by a dip-coating method, a spin-coating method, or a and spray-coating method.

Furthermore, the present invention provides a preparation method of a transparent conductive thin film, wherein the firing temperature is from 300 to 1200° C. in order to obtain the conductivity in the step c), the rate of increasing the temperature to the above temperature is from 100 to 500° C./sec, and the temperature is rapidly cooled either immediately after the step c) achieves a temperature of between 300 and 1200° C. or after maintaining for up to 20 seconds a temperature of between 300 and 1200° C. achieved by the step c).

Furthermore, the present invention provides a transparent conductive thin film that is prepared according to the above preparation method.

The present invention further provides a transparent electrode of a Liquid Crystal Display component that is prepared according to the above preparation method.

The present invention still further provides an anti-fogging heating layer for window glass that is prepared according to the above preparation method.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

Figure 1:
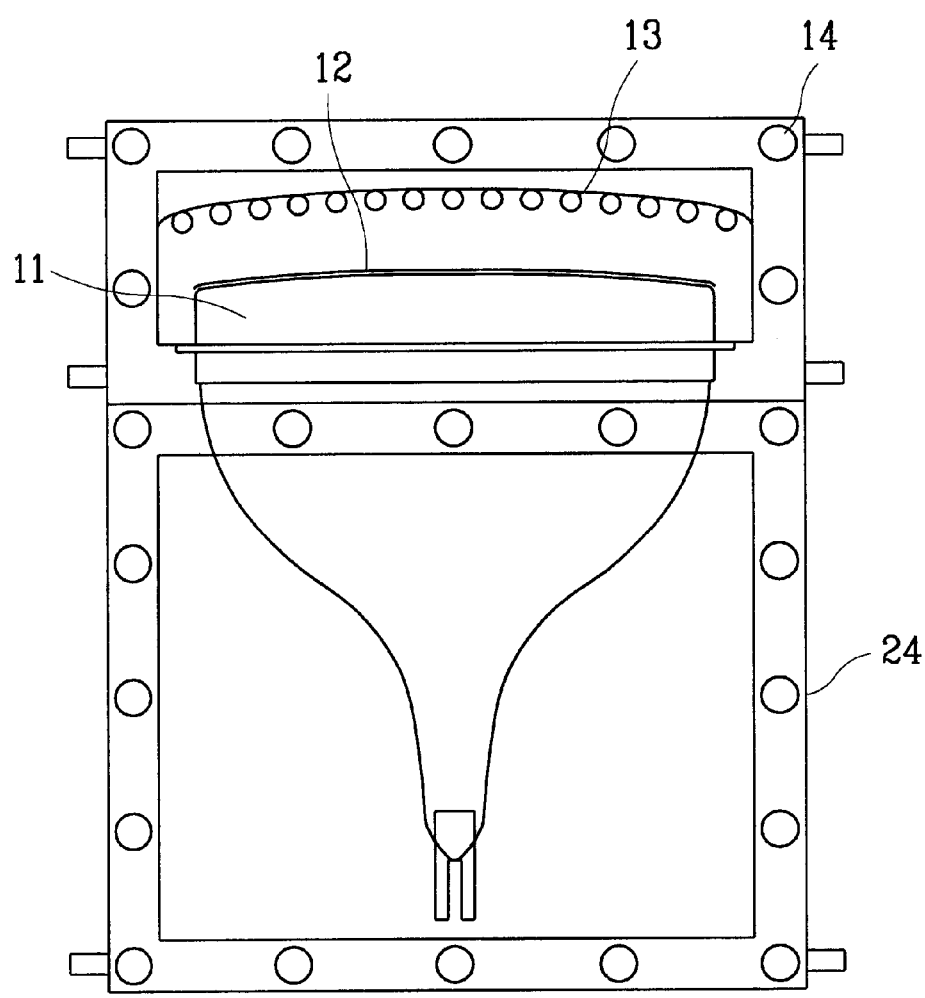
FIG. 1 is a drawing illustrating the Rapid Thermal Annealing equipment for preparing a transparent conductive thin film according to one example of the present invention.

DETAILED DESCRIPTION OF THE INVENTION.

In the following detailed description, only the preferred embodiments of the invention have been shown and described. simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

The present invention prepares an ATO or ITO sol solution in a method for forming a transparent layer using ATO or ITO when preparing a transparent conductive thin film. When using ATO, one antimony salt selected from the group consisting of tertiary antimony chloride, penta-antimony chloride, tertiary antimony fluoride, tertiary antimony iodide, and antimony acetate is dissolved by solvent so that one tin salt selected from the group consisting of quaternary tin chloride, secondary tin chloride, secondary tin acetate, quaternary tin acetate, secondary tin bromide, and quaternary tin bromide can have a content ratio of 1 to 15% in the preparation method of this sol solution. One or more of solvents selected from the group consisting of ethanol, normal butanol, isobutanol, normal propanol, isopropanol, methylisobutyl carbinol, cyclohexanol, 2-ethylhexanol, ethyl carbitol, and ethyl cellosolve are used as the above solvent.

In this process, the solution is refluxed at a temperature of 50 to 90° C. for hours, 2 to 20 equivalent weights of tertiary distilled water per tin equivalent weight are mixed in, and it is again refluxed at the above temperature for hours. Hydrochloric acid, acetic acid, iodic acid, bromic acid, hydrofluoric acid, and the like removed by drying this prepared solution at a temperature of 150° C. until it becomes powder. This is because coating capability is deteriorated due to the acidic effects of hydrochloric acid and other acids. After executing the above drying procedure, the sol solution containing 1 to 15% of solid contents suitable for coating is prepared using one or more of the above solvents.

An ITO sol solution preparation is also the same as in the above ATO preparation method, and one salt selected from the group consisting of primary indium chloride, tertiary indium chloride, tertiary indium fluoride, tertiary indium hydroxide, primary indium iodide, and tertiary indium acetate is used as an indium salt.

Referring to the drawings, the present invention is described in more detail as follows.

FIG. 1 is a drawing illustrating a Rapid Thermal Annealing equipment for the preparation of a transparent conductive thin film according to one EXAMPLE of the present invention, wherein a Rapid Thermal Annealing (RTA) method is applied to a cathode-ray tube (CRT) in which a transparent coating layer (12) is formed on a CRT panel outer surface by a dip-coating method, spin coating method, roll coating method, or the like, and where the RTA method is applied without drying or after primarily drying at a temperature of 60 to 250° C. for one to thirty minutes. A distance of 1 to 5 cm between the transparent coating layer and a tungsten-halogen lamp (13) in a RTA equipment is maintained, and the temperature is increased with a rate of 100 to 500° C./sec until it reaches a predetermined temperature from 300 to 1200° C. when this temperature is either maintained for 10 seconds or is immediately cooled. The above cooling rate is related with glass thickness and the heat that the glass receives. The thicker the material and higher the temperature, the longer the cooling time takes. It takes 15 seconds for a sample to be cooled to 150° C. when this sample has a thickness of 5 mm and is heated at 400° C. for 15 seconds. However, when a sample having a thickness of 5 mm is heated for 15 seconds at 1200° C., then 20 minutes is required for cooling to 150° C.

Water, ethyl cellosolve, or water containing ethyl cellosolve can be used as a coolant that can be added during cooling. The above coolant is maintained at a temperature of 0 to 10° C. in a cooler, circulated through a pipe having a diameter of 5 mm inside a wall of the Rapid Thermal Annealing equipment which is made of aluminum to shield a lamp and a sample, and is then cooled. The cooling time can be shortened further if a cooling fan is included. However, when a CRT is heated to the above high temperature ranging from 300 to 1200° C. and then immediately cooled, it can break depending on the purity and thickness of its glass due to the expansion and contraction of the surface of the CRT. Therefore, cooling rates for which each glass is not broken or for which conductive coating surface cracks do not occur are required to be determined by conducting prior surveys on the glass so that cooling time can be shortened. Furthermore, a firing or a Rapid Thermal Annealing proceeds under nitrogen gas, atmospheric, or argon gas environments.

Figure 2:
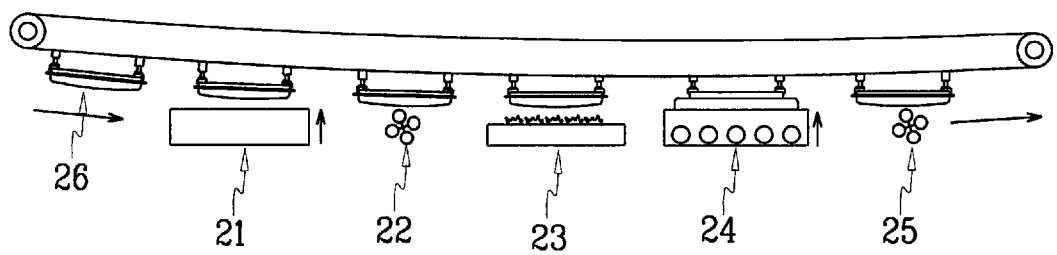
FIG. 2 is a drawing illustrating the preparation process of a transparent conductive thin film according to one example of the present invention using a dip-coating method.

Furthermore, a process in which a transparent conductive thin film is applied to a CRT by another EXAMPLE of the present invention is represented in FIG. 2.

First, a silicon oxide layer is coated and thermally cured on the surface of a CRT using a coating device (21) by a dip-coating method according to a device of FIG. 2. The reason for the silicon oxide layer coating is that in order to obtain conductive properties on a CRT conductive coating layer formed directly on the glass surface, the surface possibly containing sodium ions impurities is heated to over 300° C. The high heating process will result in such impurities remaining in the glass material. This means that constituents such as sodium ions diffuse into the surface and will disturb the movement path of electrons and hence will slow conductivity during electron movement, resulting in a conductivity deterioration. Furthermore, a silicon oxide layer is also coated in the pretreatment process as non-reflection effects can be obtained using the thickness and refractive index of the silicon oxide coating layer.

After this primary coating, the CRT is dried at room temperature for 30 seconds in a drying device (22), and maintained at 50 to 70° C. for 10 minutes in an oven (23) for the heat curing of a silicon oxide layer. Rapid Thermal Annealing equipment (24) is not applied to the present EXAMPLES since the curing is possible at a low temperature of 50 to 70° C. when a silicon oxide layer is formed.

After a silicon oxide layer is coated, a transparent conductive layer is coated on the CRT surface (26) using an ATO or ITO sol solution in a coating device (21) by a dip-coating method, dried in a drying device (22) at room temperature for 20 to 30 seconds, and heat cured with an oven (23) for a period ranging from just few minutes to dozens of minutes. After increasing the temperature to 300 to 1200° C. with a rate of 100 to 500° C./sec in Rapid Thermal Annealing equipment (24), a coating layer is fired by maintaining the same temperature for up to 20 seconds, and the irradiated coating layer is cooled in a cooling device (25) with a cooling rate of 50° C./sec at which it is known that the glass tube surfaces used in the present EXAMPLES are not broken and cracks on the coating surfaces do not occur.

In the case of using the above RTA equipment, as well as with high temperature annealing from 300 to 1200° C., within one second of attaining 300 to 1200° C. the cooling step is repeated several times for annealing. Even when annealing from the above annealing temperature continues for a duration varying from one second to dozens of seconds, similar conductivity can be obtained. Furthermore, although various devices such as fluorescent bodies, etc. that are mounted on the opposite surface of a coated surface when a CRT or monitor is completely assembled and holding a vacuum, the fluorescent bodies, etc. are not affected by the high heat since the surface heat treatment is finished almost instantaneously or within a few seconds so that the production yield can be improved. That is, although the temperature is increased to 300 to 1200° C., other areas susceptible to heat avoid experiencing a heat influx since the surface to be coated is instantaneously heated.

Furthermore, non-reflectivity greatly depends on the thickness and arrangement sequence of a silicon oxide coated thin film and an ATO or ITO thin film. As the thickness of a thin film is related with the speed, the solid content of a sol solution, and viscosity in case of a dip-coating method, thickness can be easily controlled by taking into account these elements.

Figure 3:
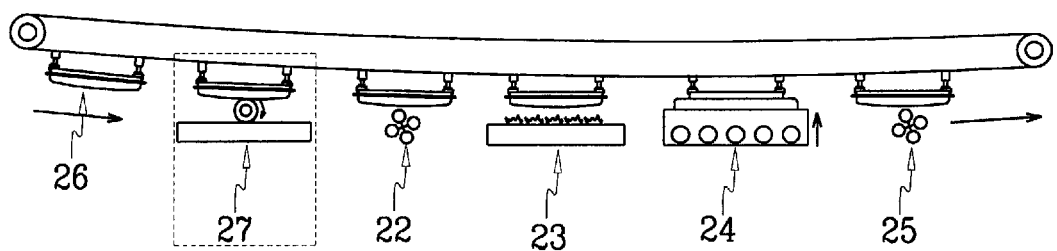
FIG. 3 is a drawing illustrating the preparation process of a transparent conductive thin film according to other example of the present invention using a roll coating method.
Figure 4:
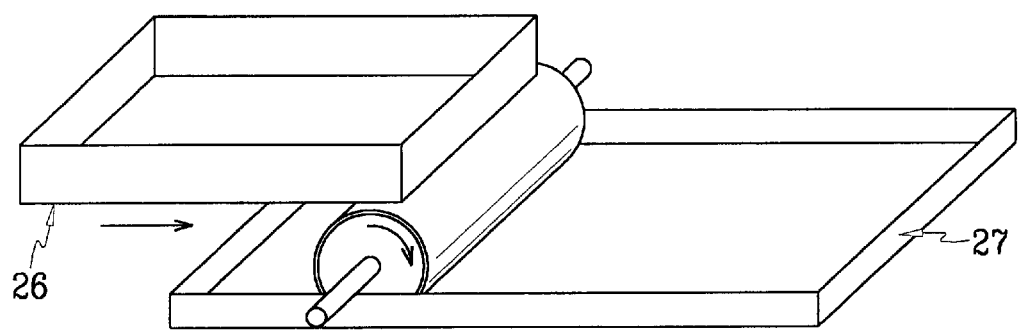
FIG. 4 is an enlarged drawing of a part of the roll coating equipment.
Figure 5:
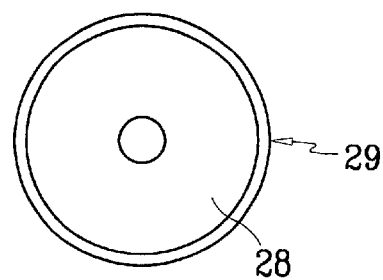
FIG. 5 is a drawing illustrating a roll of the roll coating equipment.

The process and equipment for the preparation of a transparent conductive thin film in a CRT by another EXAMPLE of the present invention are illustrated in FIGS. 3 to 5.

A roll coating method is applied to coat ATO sol or ITO sol on a CRT surface in the process illustrated in FIG. 3.

The coating fluid does not adhere well on the roll surface and the roll surface can be corroded by acidic properties of the coating fluid when the roll surface (29) illustrated in FIG. 5 is metal because the coating fluid viscosities of the coating process by the roll coating method in FIG. 3 are at the level of 1.5 to 1.8 cps. Therefore, a cloth having a thickness of 1 to 2 mm wrapped around the roll surface (29) is wetted with coating fluid for the coating process, or the roll is rotated in order to coat the coating fluid on the glass surface by providing a silicone rubber plate having a thickness of 1 to 2 mm wrapped around the roll surface (29) and forming 2,000 to 6,000 holes/cm$^2$ ranging in size from a few micrometers to dozens of micrometers, but typically having a diameter of less than 100 micrometers, on the silicon rubber surface so that coating fluid is retained in the holes.

Although the internal material (28) of the rod or barrel of which the roll is made can be hard metal, TEFLON brand polytetrafluoroethylene, glass, etc. since some CRTs and general glass in which the roll coating method is applied are mainly flat, this is inappropriate in those applications on a convex CRT surface, etc. Therefore, in order for the entire roll face to contact with the glass surface to be coated, the roll internal material (28) of the rod or barrel is made of soft silicon rubber or thin, flexible TEFLON brand polytetrafluoroethylene for bending in the case of the coating of a convex CRT.

The above preparation method can be used in manufacturing a transparent conductive thin film as well as a transparent electrode of a Liquid Crystal Display component, an anti-fogging heating layer for window glass, and the like, and can be applied to the manufacturing process of non-reflective transparent thin film glass and anti-static transparent thin film glass.

Hereinafter, the preferable EXAMPLES are suggested in order to help in the gaining of an understanding of the present invention. However, the following EXAMPLES are only for further understanding the present invention, and the present invention is not limited to the following EXAMPLES.

EXAMPLE 1

A transparent coating layer of silicon oxide with ITO or ATO was formed on a panel outer surface of a CRT by a dip-coating method as a case in which the Rapid Thermal Annealing (RTA) method is applied to a CRT. After drying the transparent coating layer primarily at 100° C., a distance of 1 to 5 cm between the transparent coating layer and a tungsten-halogen lamp in a RTA equipment is maintained, and the temperature was raised to 500° C. in 5 seconds by increasing the temperature with a temperature increasing rate of 100 to 500° C./sec, and then the layer was immediately cooled to 100° C. over 12 seconds. Water containing ethyl cellosolve as a coolant that was added during the cooling and a cooling fan were used simultaneously. Furthermore, the firing or Rapid Thermal Annealing method took place under an argon gas environment.

EXAMPLE 2

The same method as in EXAMPLE 1 was used except that after increasing the temperature to 600° C. over 5 seconds, the layer was cooled to 100° C. over 18 seconds starting immediately after the temperature reached 600° C. as in the method of the above EXAMPLE 1

COMPARATIVE EXAMPLE 1

The same method as in EXAMPLE 1 was used except that a heating furnace was used and after increasing the temperature to 500° C. over 15 minutes, it was cooled to 100° C. for 43 minutes starting immediately after temperature reached 500° C. as in the method of the above EXAMPLE 1.

COMPARATIVE EXAMPLE 2

The same method as in EXAMPLE 1 was used except that a heating furnace was used and after increasing the temperature to 600° C. for 20 minutes, the layer was cooled to 100° C. over 58 minutes starting immediately after the temperature reached 500° C. as in the method of the above EXAMPLE 1

The resistance of the transparent conductive thin films prepared by the above EXAMPLES 1 and 2 and COMPARATIVE EXAMPLES 1 and 2 were measured and the measured values were written in the following Table 1

TABLE 1

| Classification | EXAMPLE 1 | EXAMPLE 2 | COMPARATIVE EXAMPLE 1 | COMPARATIVE EXAMPLE 2 |
|---|---|---|---|---|
| | | | | (Units: $\Omega/cm^2$) |
| Resistance during ATO coating | $7.4 \times 10^4$ | $8.3 \times 10^4$ | $6.9 \times 10^4$ | $8.1 \times 10^4$ |
| Resistance during ITO coating | $6.8 \times 10^3$ | $8.8 \times 10^2$ | $7.2 \times 10^3$ | $9.3 \times 10^2$ |

When comparing the case in which a transparent conductive thin film is prepared using the Rapid Thermal Annealing method according to the present invention to the case in which a transparent conductive thin film is prepared using the conventional heating furnace method, there are no significant differences in the resistance of the prepared thin films represented in the data of the above Table 1. Therefore, it can be shown that the present invention is superior to the prior art in terms of the preparation time and yields. Furthermore, heat affects are prevented as the coated surface alone is heated even though the temperature is increased far more than during heating with a general heating furnace (high temperature oven).

A method for the preparation of a thin film of the present invention can be preferentially applied to a flat type CRT surface, monitor surface, car glass anti-fogging heating wires, and the like, and can, significantly shorten the process time compared with the conventional heating furnace method which results in improved production yields.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method for the preparation of a transparent conductive film comprising the steps of:
   a) preparing a sol solution of at least one tin oxide selected from the group consisting of antimony-tin oxides (ATO) and indium-tin oxides (ITO);
   b) forming a transparent coating layer on an outer surface of a cathode-ray tube using the sol solution of at least one tin oxide selected from the group consisting of antimony-tin oxides (ATO) and indium-tin oxides (ITO); and
   c) increasing a temperature of the entire transparent coating layer simultaneously to a predetermined temperature, and cooling the transparent coating layer after maintaining the predetermined temperature for no more than 20 seconds.

2. The method for the preparation of a transparent conductive film in accordance with claim 1 further comprising a step of coating a $SiO_2$ layer on the outer surface of the cathode-ray tube before the step b).

3. The method for the preparation of a transparent conductive film in accordance with claim 1 further comprising a step of drying the transparent coating layer for one to thirty minutes at a temperature of 60 to 250° C. before the step c).

4. The method for the preparation of a transparent conductive film in accordance with claim 1, wherein the temperature increasing step of c) is carried out under an environment of at least one of nitrogen gas and argon gas.

5. The method for the preparation of a transparent conductive film in accordance with claim 1, wherein the transparent coating layer is formed by a method selected from the group consisting of a dip-coating method, a spin-coating method, a spray-coating method, and a roll coating method.

6. The method for the preparation of a transparent conductive film in accordance with claim 5, wherein the roll coating method is carried out with a roll comprising:
  a) an interior member which is made of a material selected from the group consisting of glass, polytetrafluoroethylene, and silicone rubber; and
  b) a material for covering the surface of the interior member, wherein the material is selected from the group consisting of a rubber having a thickness of 1 to 2 mm on which 2,000 to 6,000 holes having a diameter of less than 100 micrometers are formed in 1 $cm^2$, and a cloth having a thickness of 1 to 2 mm.

7. The method for the preparation of a transparent conductive film in accordance with claim 5, wherein the roll coating method is carried out with a roll having an interior member made of a material selected from the group consisting of silicone rubber and polytetrafluoroethylene which is flexible for applying to a convex coating surface of a CRT.

8. The method for the preparation of a transparent conductive film in accordance with claim 1, wherein the predetermined temperature is from 300 to 1200° C.

9. The method for the preparation of a transparent conductive film in accordance with claim 8, wherein the rate of increasing temperature to the predetermined temperature is from 100 to 500° C./sec.

10. The method for the preparation of a transparent conductive film in accordance with claim 1, wherein the cooling step is carried out using at least one coolant selected from the group consisting of water and ethyl cellosolve.

11. The method for the preparation of a transparent conductive film in accordance with claim 10, wherein the cooling step is carried out using a cooling fan.

12. The method for the preparation of a transparent conductive film in accordance with claim 1, wherein the temperature increasing step is carried out using a tungsten-halogen lamp.

13. A method for the preparation of a transparent conductive film comprising the steps of:
  a) preparing a sol solution of at least one tin oxide selected from the group consisting of antimony-tin oxides (ATO) and indium-tin oxides (ITO);
  b) forming a transparent coating layer on an outer surface of a cathode-ray tube using the sol solution of at least one tin oxide selected from the group consisting of antimony-tin oxides (ATO) and indium-tin oxides (ITO); and
  c) increasing a temperature of the entire transparent coating layer simultaneously at a heating temperature rate to a predetermined temperature, and cooling the transparent coating layer at a cooling temperature rate after maintaining the predetermined temperature for no more than 20 seconds, wherein the heating temperature rate is higher than the cooling temperature rate.

14. The method for the preparation of a transparent conductive thin film in accordance with claim 13, wherein the cooling temperature rate is selected to be lower than a maximum cooling temperature rate at which at least one crack on the transparent coating layer occurs.

15. The method for the preparation of a transparent conductive thin film in accordance with claim 14, wherein the maximum cooling temperature rate is 50° C./sec.

16. The method for the preparation of a transparent conductive thin film in accordance with claim 13, wherein the heating rate is 100 to 500° C./sec.

* * * * *